United States Patent [19]
Chang

[11] Patent Number: 5,842,374
[45] Date of Patent: Dec. 1, 1998

[54] MEASURING METHOD OF A WIDE RANGE LEVEL AND AN APPARATUS THEREOF

[75] Inventor: Hak Soo Chang, Seoul, Rep. of Korea

[73] Assignee: Changmin Co., Ltd., Seoul, Rep. of Korea

[21] Appl. No.: 406,151

[22] Filed: Mar. 17, 1995

[30] Foreign Application Priority Data

Jun. 2, 1994 [KR] Rep. of Korea ............... 1994-12408
Jan. 18, 1995 [KR] Rep. of Korea ................. 1995-752

[51] Int. Cl.$^6$ .................................................. G01F 23/00
[52] U.S. Cl. .................................... 73/290 R; 73/290 V
[58] Field of Search .......................... 73/290 R, 290 V, 73/32 A, 447

[56] References Cited

U.S. PATENT DOCUMENTS

| | | | |
|---|---|---|---|
| 3,597,971 | 8/1971 | Erienbach | 73/447 |
| 3,597,973 | 8/1971 | Ryder | 73/447 |
| 3,890,840 | 6/1975 | Malloy | 73/290 V |
| 3,921,461 | 11/1975 | Layton | 73/447 |
| 3,954,010 | 5/1976 | Hilblom | 73/447 |
| 4,063,457 | 12/1977 | Zekulin et al. | 73/290 V |
| 4,943,186 | 7/1990 | McCoy | 73/290 V |
| 5,119,676 | 6/1992 | Bower . | |

FOREIGN PATENT DOCUMENTS

| | | | |
|---|---|---|---|
| 0262019 | 12/1985 | Japan | 73/290 V |
| 1462113 | 1/1987 | U.S.S.R. | 73/290 V |
| 9302340 | 2/1993 | WIPO | 73/290 V |

*Primary Examiner*—George M. Dombroske
*Assistant Examiner*—Jewel V. Artis
*Attorney, Agent, or Firm*—Ladas & Parry

[57] ABSTRACT

A method for measuring the water level of a reservoir, a larger river and an underground water and an apparatus thereof comprises a waveguide tube selected in a predetermined length, on the upper portion of which a sonic pulse generator is mounted, and a plurality of sonic receivers (first, second, third . . . nth), such as a microphone, arranged at an interval 1 from each another, in which the sonic pulse generator generates sonic impulses in a predetermined period, the receivers receive impulses divided into advancing waves and reflecting waves in turns, these impulses are amplified/wave-shaped to be applied to a microprocessor, and the microprocessor measures the time interval $t_1$ between the advancing wave and the reflecting wave received by first sonic receiver and the time interval $t_{n-1}$ between first sonic receiver and the n–1th sonic receiver located close to the water surface so as to calculate the water level L. Also, when the water level L is measured on the slope surface of a reservoir, a larger river, etc., a ball type float is inserted in the waveguide tube. In order to measure the water level of the underground water, a supporting rod, which has a plurality of sonic receivers (first, second, third . . . nth) are fixed at a predetermined interval l, is inserted into an underground water observing tube instead of the waveguide tube.

9 Claims, 7 Drawing Sheets

F I G. 1
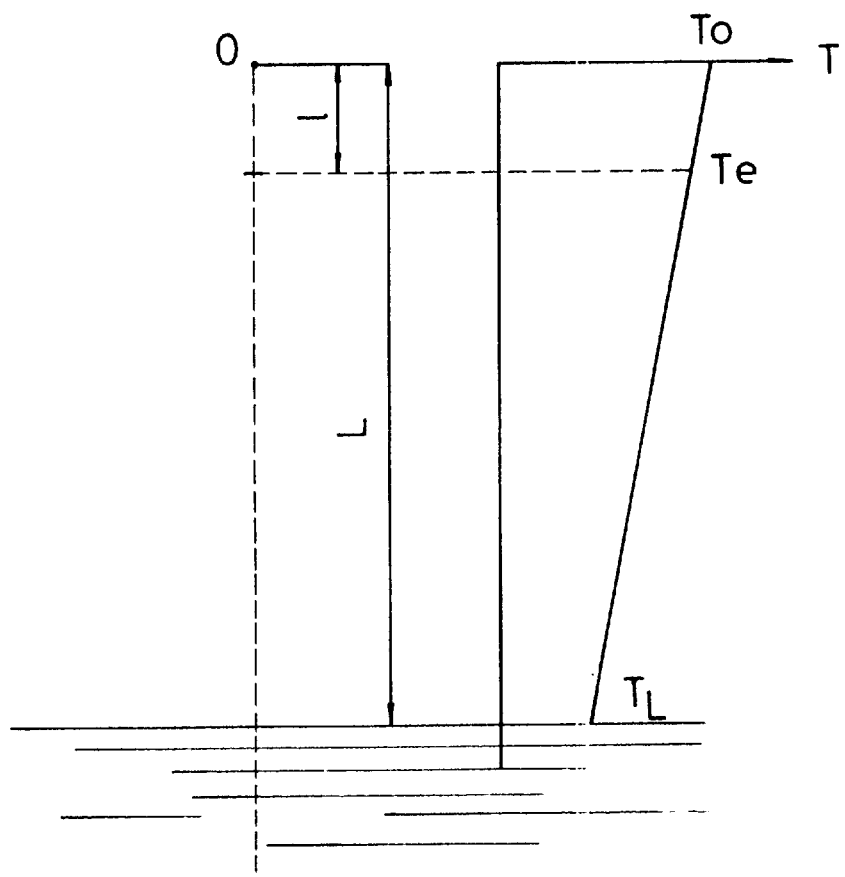

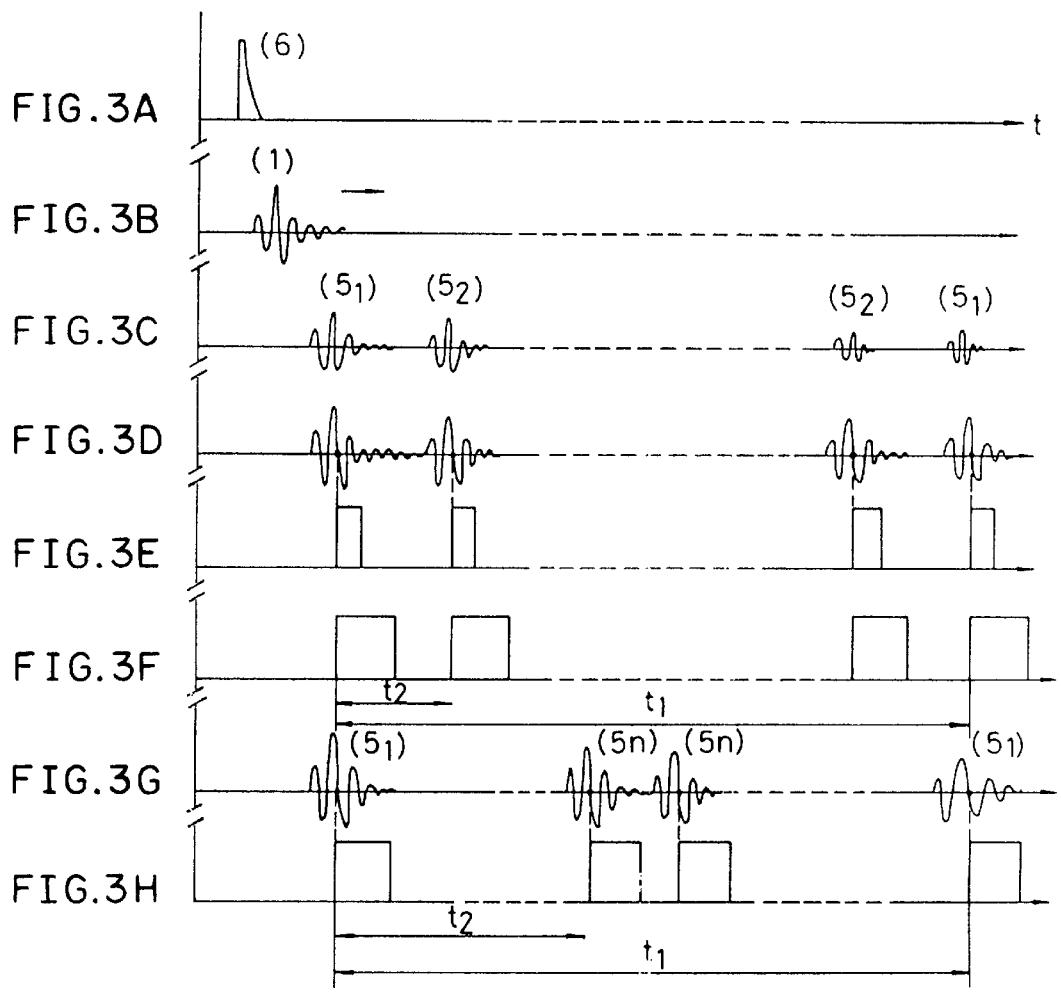

MEASURING METHOD OF A WIDE RANGE LEVEL AND AN APPARATUS THEREOF

BACKGROUND OF INVENTION

The invention is related to a technology for measuring the water level by using a sound wave, and particularly, to a method for measuring the water level of reservoirs, large rivers and an underground water in which the circumferential temperature and humidity are varied in a large range, including a levelmeter, and an apparatus thereof.

The most typical levelmeter for observing a floodgate is a float type levelmeter. The float type levelmeter has advantages in that it can operate a mechanical and automatic water level recorder without using a power source and is convenient to construct a telemetry system with an "angle-code" transducer connected to a wheel thereof.

But, the float type levelmeter has disadvantages as follows.

Since the float levelmeter is operated only in a downward or upward direction, it requires a vertical structure for mounting its own levelmeter, for example a tower. In other words, if the water level of a reservoir is changed by several tens of meters, a tower having the height of several tens of meters is necessary.

The sensitivity of the float levelmeter is almost proportional to the diameter of the float. Then, in order to automatically record or remote-measure the deep underground water level the diameter of a measuring well for observing the underground water level must be large.

If the scope of the water level to be measured is several tens of meters, a rope connected to the levelmeter must have the length of several tens of meters. This causes measuring errors of the water level to become greater due to the thermal expansion and construction according to the circumferential temperature.

A correcting tester for the float levelmeter must be a vertical type. If the scope of the water level to be measured is several tens of meters, the correcting tester becomes more complex because its height must be several tens of meters.

These disadvantages restrict the scope of the water level to be measured by the float levelmeter as well as become harder to use in measuring the water level of reservoirs, large rivers and underground water.

Furthermore, measuring the water level of a reservoir and river even with any levelmeter requires the countermeasures to suppress the vibration or wave of water, so it is necessary to construct a large complex structure.

In order to resolve these disadvantages, various levelmeters have been developed. For example, there is a levelmeter for measuring the depth of water and then counting the water level, which a pressure sensor is mounted in the predetermined depth of water so as to gauge the water pressure. The disadvantages of the levelmeter are as follows:

The installation of the pressure sensor at the previous designated place requires underwater work to mount the cable for connecting the pressure sensor to a pressure gauge and pipes for transferring an atmospheric pressure to the pressure sensor along the edge of a river. It is also difficult to maintain and operate including the periodical replacement of a pressure sensor, etc.

Even if the pressure sensor has a superior performance, the measurement of the water depth H is calculated by the formula $H = P - P_o/P$, wherein P is the density of water, P is a pressure measured by a pressure sensor and $P_o$ is an atmospheric pressure. The average density of water on the horizontal line of a reservoir is not an unchangeable integer, but changes according to the temperature and component. Similarly, the atmospheric pressure $P_o$ is a kind of variable. Therefore, it is not easy to accurately compensate for these factors. In addition, the wave height is often formed by several meters in a larger reservoir, so it causes a greater measuring error of the water depth.

On the other hand, there would be a sonic levelmeter which also causes greater error than that accompanied by the use of a pressure sensor while it has the same disadvantages as those of the levelmeter provided with the pressure sensor in respect of its maintenance and operation. There has been developed a type of a sonic levelmeter in which a sonic transducer is mounted in a predetermined distance over the water surface, so that a time t starting from the time of launching sonic pulses, propagating through air, reflecting on the water surface until reaching the sonic transducer is measured. In other words, various industrial sonic levelmeters for measuring the water level L were developed. The water level L is as follows:

$$L = \frac{t \cdot C}{2} \quad (1)$$

Wherein, C is a sonic propagation velocity in air at the time of measuring the water level. But, the sonic velocity in air or other gases is a variable which is changeable according to the temperature, pressure, component and humidity of air or other gases. It means that the exact sonic velocity must be confirmed to reduce the measuring error of the water level.

There are two methods for compensating for the sonic velocity C, which are well known in the sonic levelmeter field. One method is to measure the temperature and calculate the sonic velocity C with a sonic vibrator and a temperature sensor combined with each other, assuming that the component of air is uniform, and the temperature in the gap between the sonic vibrator and the water surface is even. At that time, the sonic velocity C is as follows:

$$C = C_o - \alpha T \quad (2)$$

Wherein, $\alpha$ is a sonic temperature coefficient, T is the temperature of air and $C_o$ is a sonic velocity when the temperature of air is 0° C. The sonic levelmeter is almost always used while being inserted into a closed vessel, if the change of the water level is not serious. When the water levels of the reservoir, large river and underground water are measured, the water levels L are differentiated by several tens of meters, and the temperature distribution of air in the water level section L may be varied, so it is not possible to compensate for the average sonic velocity in the water level section L by using only the temperature measured at one place, and furthermore the change of the sonic velocity according to the pressure and component of gases is ignored.

Another method for compensating for the change of the sonic velocity for measuring the time $t_o$, which it takes to launch sonic waves from a sonic vibrator, reflecting them on a reflecting piece or rod and reaching them to the sonic vibrator, and then counting the water level L with a reflecting piece or rod being mounted in a predetermined vertical interval away from the sonic vibrator. The water level L is as follows:

$$L = \frac{t}{t_o} l \quad (3)$$

Assuming that $t_o$ is $2l/C$, and $t = 2L/C$, the water level is L. In this case, the sonic velocity $C_l$ in the section l is equal to the sonic velocity $C_L$ in the section L to establish the formula $C_l=C_L=C$. It means that errors for compensating for the sonic velocity are not existent. Also, the latter method is superior to the former method using the temperature sensor in respect of the compensation effect of the sonic velocity. These sonic levelmeters were developed and are just now sold by the Ultraflux Co. and Tokimec Co., etc. If the sonic velocity $C_l$ is not equal to the sonic velocity $C_L$, the water level L' is calculated by the formula (2) as follows:

$$L' = L \frac{C_l}{C_L}$$

Then, the relative error $\delta_{L'}$ between the measured water level L' and a true water level L is calculated as follows:

$$\delta_{L'} = \frac{C_l}{C_L} - 1 \quad (4)$$

In other words, as shown in FIG. 1, the air temperature is distributed in a straight line having a gradient (tan Θ) in a section L. Assuming that the temperature at the position "O" of the sonic vibrator is $T_o$, the temperature at the position l is $T_l$, and the temperature at the water surface is $T_L$, the average temperatures $T_l$ and $T_L$ are as follows:

$$\overline{T}_l = \frac{T_o + T_l}{2} = \frac{T_o + \left(T_o - \frac{T_o - T_L}{L} \cdot l\right)}{2} = \frac{2T_o - \frac{T_o - T_L}{L} \cdot l}{2};$$

$$\overline{T}_L = \frac{T_o + T_L}{2}$$

The average temperatures $T_l$ and $T_L$ are substituted in order into the formulas (2) and (4).

$$\delta_{L'} = \frac{0.5\alpha \left[\left(1 - \frac{l}{L}\right)(T_o - T_L)\right]}{C_o + 0.5\alpha(T_o + T_L)} \quad (5)$$

As represented in the formula (5), if $T_o$ is equal to $T_L$, the relative error $\delta_{L'}$ is equal to zero. If $T_o$ is not equal to $T_L$, and the ratio of l/L approaches around 1, the relative error $\delta_{L'}$ becomes less. But, under the condition that section L is varied several tens of times over section l, the temperature difference $T_o-T_L$ become greater. As the ratio of l/L decreases, the error increases. Considering these varied conditions, the measuring scope of the water level is selected so that L is approximately 2l to 5l. But, the allowable error of the water level is required to be below 1 cm all over the area to be measured in the reservoir, river and underground water. For example, when l=0.5 m, L=20 m, $T_o$=30° C., $T_L$=20° C. and α=0.6, $$\Delta_L = L \cdot \delta_{L'} = \frac{20 \cdot 0.5 \cdot 0.6 \left[\left(1 - \frac{0.5}{20}\right)(30 - 20)\right]}{331.6 + 0.5 \cdot 0.6(30 + 20)} = 1.68 \text{ m}$$

As shown in the above formula, the absolute error $\Delta_L$ is almost 17 cm. If l is 5 or 10 m, the absolute errors $\Delta_L$ are 13 cm and 8 cm. If the temperature difference is 5° C. ($T_o$=30° C.), at that time the absolute errors $\Delta_L$ are one-half of the above errors, for example, 8.5, 6.5 and 4 cm.

Accordingly, in order to resolve the disadvantages of two sonic compensating methods using a reflective rod, the main object of the invention is to provide a sonic levelmeter system by which the measuring error of a water level is not increased throughout an area to be measured even when the measuring range is greater.

The other object of the invention is to provide a method for measuring the water level of a reservoir, large river and an underground water, on the slope surface of which a sonic hydrometer is mounted, and an apparatus thereof without requiring a vertical tower for use in a hygrometry operation in a vertical direction like a float and an apparatus to suppress the vibration of water.

Another object of the invention is to provide a method for measuring the water level of a reservoir, large river and an underground water and an apparatus thereof including a sonic levelmeter in which a water level observing well of the underground water can be used in order to perform the automatic measurement of the water level. It should be noted that a sonic levelmeter as described and claimed herein contemplates uses of sound frequencies not limited just to the band of frequencies audible to the human ear (at least 20–20,000 Hz). Ultrasonics (above 20,000 Hz) and infrasonics (below 20 Hz) should be included in the definition of sonics as used herein.

SUMMARY OF THE INVENTION

According to the invention, a method for measuring the water level of a reservoir, large river and an underground water and an apparatus thereof comprises a waveguide tube selected in a predetermined length, on the upper portion of which a sonic pulse generator is mounted, and a plurality of sonic receivers (first, second, third . . . nth), such as a microphone, arranged at an interval distance l from each other, in which the sonic pulse generator generates sonic impulses in a predetermined period, the receivers receive impulses divided into advancing waves and reflecting waves in turn, these impulses are amplified/wave-shaped to be applied to a microprocessor, and the microprocessor measures the time interval $t_1$ between the advancing wave and the reflecting wave received by first sonic receiver and the time interval $t_{n-1}$ between first sonic receiver and the n-1th sonic receiver located close to the water surface so as to calculate the water level L. Also, when the water level L is measured on the slope surface of a reservoir, large river, etc., a ball-type float is inserted in the waveguide tube. On the contrary, it is not necessary to use the float in measuring the water level of a relatively smaller river in which the waveguide tube can be mounted in a vertical direction. In order to measure the water level of underground water, the invention provides a supporting rod, which has a plurality of sonic receivers (first, second, third . . . nth) fixed at a predetermined interval l, to be inserted into an underground water observing tube instead of the waveguide tube.

BRIEF DESCRIPTION OF THE DRAWINGS

The invention now will be described in detail with reference to the accompanying drawings, in which:

FIG. 1 is a view illustrating the principle of compensation for a sonic speed by using a reflective piece or rod in a conventional levelmeter;

FIG. 3 is a timing diagram illustrating the operating principle of the water level measuring apparatus according to the invention;

DETAILED DESCRIPTION OF THE INVENTION

Figure 2:
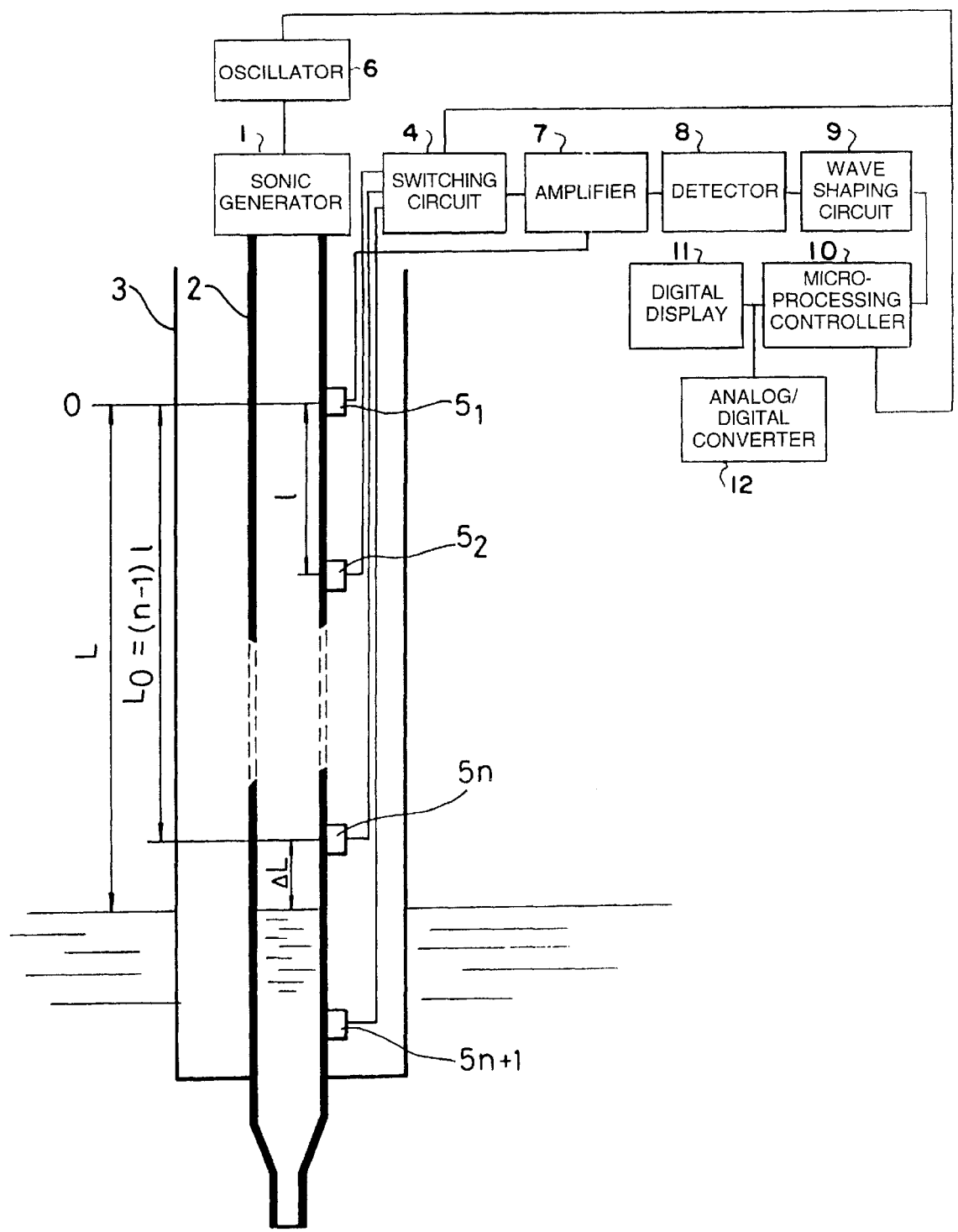
FIG. 2 is a block diagram illustrating the fundamental configuration of a water level measuring apparatus according to the invention.

Referring to FIG. 2, a water level measuring apparatus according to the invention is vertically mounted in a block diagram form. First, a pipe or a waveguide tube 2 is mounted at its lower portion on the lowest place to be measured, the total length of which is set to be longer than the whole width of the changed water level. A sonic generator 1 is fixed on the top portion of the waveguide tube 2. A microphone or a sonic receiver $5_1$ is mounted on the place spaced away at a predetermined distance which is a multiple of the diameter of the waveguide tube from the sonic generator 1 on the side of the waveguide tube 2, which is called a sound pressure sensor. Other sonic receivers $5_2, 5_3, \ldots, 5_{n+1}$, are in turn mounted at a distance l from the first receiver $5_1$. Thus, during the sonic water level measuring apparatus being operated, an oscillator 6 is operated to apply impulses to the sonic generator 1 as shown in FIG. 3 (I). At that time, sine-wave signals having one or two periods may be applied to the sonic generator 1 instead of impulses.

Subsequently, the sonic generator 1 generates sonic pulses as shown in FIG. 3 (II) which are propagated along the waveguide tube 2. Sonic pulses are directly or indirectly received by all sonic receivers. A receiver switching circuit 4 is connected to the outputs of the second, third . . . n+1th receivers $5_2, 5_3, \ldots, 5_{n+1}$ and the input of an amplifier 7, and the receiver $5_1$ is always connected to the input of the amplifier 7.

Therefore, the receiver $5_1$ firstly receives the advancing pulse from the sonic generator 1, and other receivers $5_2, 5_3,$ . . . receive advancing pulses in turn by the time difference l/C as shown in FIG. 3 (III). Also, the sonic pulses reflected on the water surface are received in reverse turn by the receivers $5_n, \ldots, 5_2, 5_1$. These receivers $5_1, 5_2, \ldots$ apply the receiving signals to the amplifier 7 to amplify them. The amplifier 7 increases its own amplifying level based on the elapsing time after the predetermined time period being elapsed, when a microprocessing controller 10 outputs a sonic generating signal to the oscillator 6 to enable the sonic generator 1 to generate sonic pulses. As the amplifier 7 receives the fourth receiver's pulse signal, its amplifying degree returns to the original level, and the amplitude of pulse signals is restored to the original state. So, the amplitudes of the outputting signals appear constant even at any receiver positioned on the predetermined place. The reflected sonic pulses also are constant at their amplitude as shown in FIG. 3 (IV).

The outputs from the amplifier 7 are applied to a detector 8 to detect a zero-crossing point 0 at the half period of the maximum amplitude of each of the received signals, which represent one-half period of the received signals in FIG. 3 (IV), as well as to generate pulses as shown in FIG. 3 (V).

These pulses may be directly used or are inputted to a wave shaping circuit 9 to generate pulses as shown in FIG. 3 (VI). The microprocessing controller 10 receives pulses from the wave shaping circuit 9 to measure the pulse receiving timing and calculate the frequency of the repetitive measurement and its average value to obtain the water level. A digital display 11 represents the operation status of a system based on the input data of the microprocessing controller 10. An analog/digital converter 12 converts analog signals from the microprocessing controller 10 into digital signals, the outputs of which may be input to an automatic water level recorder or transmitted to a telemetry system. Herein, a detailed explanation of these elements is omitted because they are well-known and excluded in the claims.

On the other hand, it is noted that the position of the sonic receiver $5_1$ is a reference point by zero. As four wave-shaped pulses are inputted to the microprocessing controller 10, the timing intervals $t_1$ and $t_2$ as shown in FIG. 3 (VI) are measured, and the approximate value L' of the water level L is calculated as follows:

$$L' = \frac{t_1}{t_2} \cdot l \qquad (6)$$

But, since the sonic speed $C_2$ at the section l is not equal to the sonic speed $C_2$ at the section L, the water level calculated by the formula (6) is not exact. Thus, the approximate value L' of the water level is first calculated and then the receiver $5_n$ placed closest to the water surface is calculated/selected as follows:

$$\frac{L'}{l} + 1 = n + a \qquad (7)$$

Wherein, if n+a is equal to n+1, the nth receiver $5_n$ is considered to be selected. If n+a is a n, the (n−1)th receiver $5_{n-1}$ is considered to be selected. In other words, the microprocessing controller 10 determines the receiver to be selected and then operates the switching circuit 4 so as to connect the selected receivers $5_n$ to the amplifier 7. After the operation of the switching circuit 4, the sonic launching signal from the microprocessing controller 10 is applied to the oscillator 6 so that the sonic vibrator 6 is operated to generate the sonic pulses. At that time, the signals received from the sonic receivers $5_1$ and $5_n$ are the same as shown in FIG. 3 (VII). After the shaping of these signals, the shaped pulses are the same as shown in FIG. 3 (VIII).

The microprocessing controller 10 measures the time intervals $t_2$ and $t_1$ and computes the exact water level L as follows:

$$L' = \frac{t_1}{2t_2} \cdot (n-1)l \qquad (8)$$

Herein, n is the number of the receiver to be operated, and l is an interval between the receivers.

On the other hand, as the length $L_o$ up to the receiver $5_n$ is already known, instead of the formula (8) the water level L is calculated as follows:

$$L' = \frac{t_1}{2t_2} \cdot L_o \qquad (9)$$

However, the sonic speed $C_2$ in the section of the distance Lo can not be complied with the sonic speed $C_1$ in the section of the distance L. The water level L' is calculated dependent on the formula (9) as follows:

$$L' = \frac{2LC_2}{2C_1 \cdot L_o} \cdot L_o = L \cdot \frac{C_2}{C_1} \qquad (10)$$

Therefore, the relative error of the water level measurement is $\delta_L = C_2/C_1 - 1$. Assuming that the temperature differences compared at the "0" point and the "L" point are distributed in a linear form as the well known error analysis, the relative error of the water level measurement is as follows:

$$\delta_L = \frac{0.5\alpha(T_o - T_L)}{C_o + 0.5\alpha(T_o + t_L)} \cdot \frac{\Delta L}{L} \qquad (11)$$

Wherein, $\Delta L$ is an interval distance from the selected receiver $5_n$ to the water surface. Thus, the maximum error to be anticipated is about l.

$$\delta_{L_{max}} = \frac{0.5\alpha(T_o - T_L) \cdot \frac{l}{L}}{C_o + 0.5\alpha(T_o + T_L)} \qquad (12)$$

It is noted that as the scope to be measured increases larger, the relative error becomes smaller contrary to the conventional techniques (referring to the formula (5)), and the absolute error is not varied independent of the measuring scope. The absolute error (the sonic compensating error) is as follows:

$$\Delta_L = 0 \sim \frac{0.5\alpha(T_o - T_L)}{C_o + 0.5\alpha(T_o + T_L)} \cdot l \qquad (13)$$

If the allowable value of the absolute error, the maximum temperature difference $T_o - T_L$ and the sum of the temperature are given, the interval l between the sonic receivers is computed as follows:

$$l = \Delta_L \cdot \frac{331.6 + 0.3 \cdot (T_o + T_L)}{0.3(T_o - T_L)} \qquad (14)$$

For example, in view of the hydrology observation the allowable error of the water level measurement is limited by ±1 cm through the total range to be measured. Assuming that in summer $T_o$ is a 40° C. and $T_L$ is a 25° C., and in winter $T_o$ is a 0° C. and $T_L$ is a 15° C., the intervals l are as follows:

$$\text{In summer, } l = 0.01 \cdot \frac{331.6 + 0.3 \cdot (40 + 25)}{0.3(40 - 25)} = 0.78 \text{ m}$$

$$\text{In winter } l = 0.01 \cdot \frac{331.6 + 0.3 \cdot 15}{0.3 \cdot 15} = 0.74 \text{ m}$$

However, the inner temperature distribution of the waveguide tube in situ is not changed in a linear form, but changed in a gentle slope form. It means that the selection of l=1 m is suitable for summer or winter. For example, when the length of the waveguide tube exposed to air is 82 m in the reservoir, assuming that l is 2 m, under the conditions that the circumferential temperature is changed between 0° C. and 42° C. and the temperature of the water surface is changed between 15° C. and 24° C., the maximum absolute error does not exceed ±1 cm, and the average absolute error is ±4 mm.

In addition to above methods for measuring water levels, in order to reduce error measuring may be calculated by the sonic pulse propagation time between two receivers placed closest to the water surface, but the experimental result indicated that the error was increased. For example, according to the invention the absolute error is 4 mm with being substituted into the formula (13), and the error obtained by a conventional method is 168 mm.

On the other hand, in the embodiment the frequency f of the sonic pulse is selected according to the inner diameter D of the waveguide tube as follows:

$$f \leq \frac{C}{2D} \qquad (15)$$

The sonic pulses are propagated in a plane wave form in the waveguide tube. In order to make sure of the measuring scope by 100 m, the inner diameter D is suitable for 0.1 m. At that time, the frequency of the sonic pulse is 1750 Hz under the condition that the sound velocity is approximately 350 m/sec. Herein, it is noted that the sonic pulse over 20 kHz be not used. Thus, the invention has a lower attenuation factor, greater measuring scope and smaller measuring error.

Figure 4A:
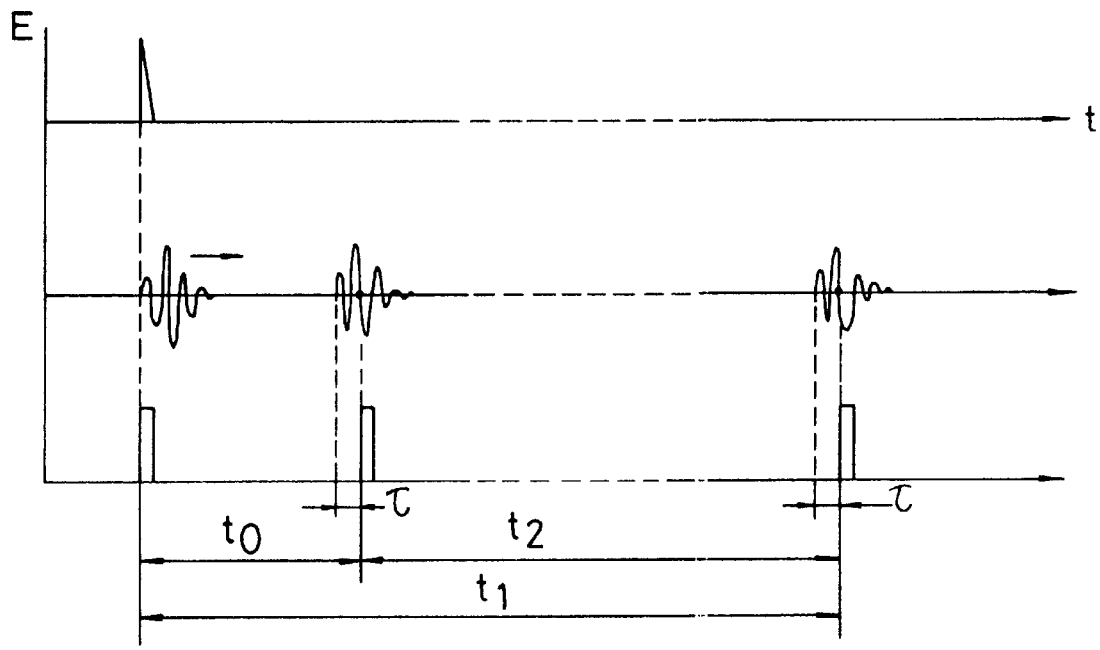
FIGS. 4A and 4B are views illustrating a delay time distribution which occurs in each of the conventional levelmeters and the water level measuring apparatus according to the invention.

The invention is also characterized in that a transducer includes a sonic generator and sonic receivers separated from each other. Thus, it is not necessary to compensate for the delay time of an electronic circuit, a transducer, cables etc. in measuring the sonic propagation time. For example, the delay time during the measuring of the sonic propagation time in a prior art occurs as follows: When only one sonic transducer is used, the sonic propagation time starts to be measured as soon as the sonic launching signal is applied to the transducer. At that time, the transducer has a delay time until the generating of the sonic pulse, but it is ignored. Then, the sonic pulse signals reflected on the water surface or the reflective rod as shown in FIG. 4A are received at the receiver. If the reflective signals are zero-crossed at the time of reaching the receiver, the portions corresponding to 1.5 to 2nd period of the sonic pulse signal are detected. If the frequency of the sonic pulse signal is 20 kHz, the 1.5 to 2nd period is 0.75 to $1.0 \cdot 10^{-4}$ second. Then, if the delay time $\tau$ is ignored, the absolute error of the water level L is as follows:

$$\Delta_L \approx \frac{\tau C}{2} \left( \frac{L}{l} - 1 \right) \qquad (a)$$

Wherein, C is a sonic velocity, l is an interval between a sonic transducer and a reflective rod. Assuming that $\tau$ is $10^{-4}$, C is 350 m/sec and L/l is 10, the absolute error is 11 cm. The more the measuring range is widened, the more the water level measuring error increases. Thus, the delay time must be compensated. In particular, the larger width levelmeter is supposed to use a lower frequency. If the frequency is 2 kHz, the delay time $\tau$ is $10^{-3}$ seconds. Thus, even though the compensation error of the delay time is 1%, the absolute error is 1 cm.

Figure 4B:
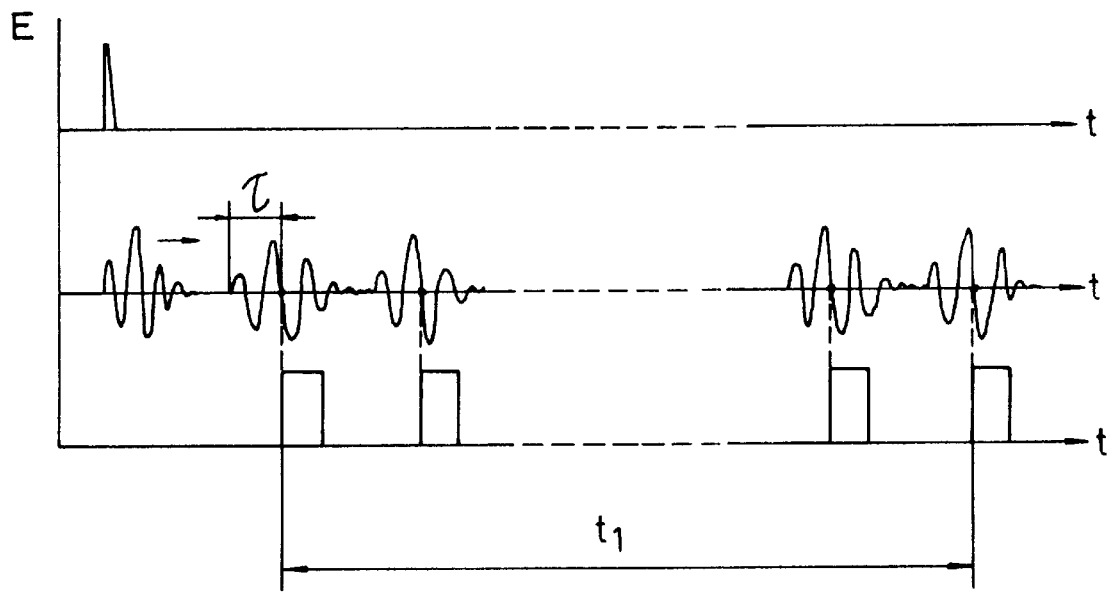

According to the invention, the sonic transducer is used with a generator and a receiver being separated from each other. Therefore, even through the frequency is relatively lower, the delay time does not occur as shown in FIG. 4B. Herein, it is noted in this embodiment that the compensation of the sonic velocity is thoroughly carried out and the delay time is excluded from the measurement of the propagation time. Thus, it is possible to measure the larger width water level using the sonic wave of the lower frequency. And also the error correction can be established independent of the measuring scope.

Figure 5:
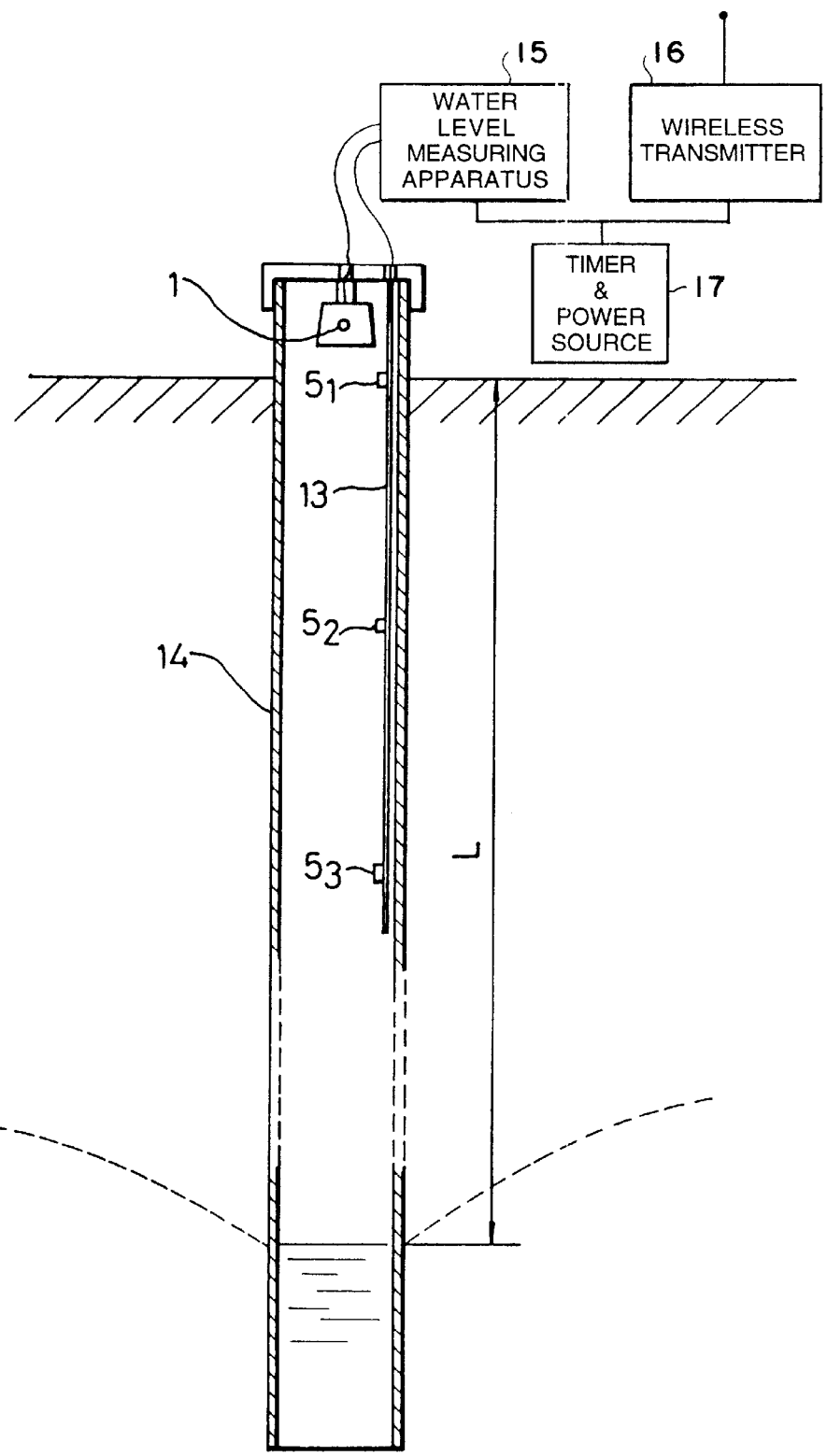
FIG. 5 is a view illustrating a method for measuring the water level of underground water using the water level measuring apparatus according to the invention.

FIG. 5 is a view illustrating an example for using a sonic water level measuring apparatus in measuring the water level of underground water according to the invention. Herein, a water level observation tube 14 is substituted by the waveguide tube so as to act to propagate the sonic pulses in the underground water. The water level observation tube 14 comprises a sonic pulse generator 1 mounted on its upper portion and sonic receivers $5_1$, $5_2$ . . . $5_n$ mounted at an interval distance on a supporting rod, which is inserted into the water level observation tube 14. Of course, the installment of the ultrasonic water level measuring apparatus is not for observing the water level during the tour of an observer. The sonic water level measuring apparatus is used along with an automatic recorder of the water level when the water level of the observation tube 14 is measured using the telemetry system in a time interval in the underground water.

In FIG. 5, a block 15 represents a water level measuring circuit including all components of FIG. 2. A wireless transmitter 16 is connected to the block 15 to transmit the water level data measured to a remote central station having a master computer. A timer and power source 17 supplies power to the block 15 and the wireless transmitter 16 and operates them at a predetermined time interval.

The normal observing tube 14 is generally within the scope of 10 to 20 cm at the inner diameter. If the sonic pulse frequency is used at the range of 1 to 1.5 kHz adapting to the tube, it is guaranteed that the maximum scope to be measured is up to about 200 m. The curve as shown in a dotted line of FIG. 5 is a depression curve of the underground water. The temperature distribution in the observing tube 14 of the underground water is severely changed up to the depth of 5 m from the ground surface, but as the depth is much deeper, the temperature change becomes smaller. Thus, even though the range of the water level to be measured becomes greater, it is not necessary to mount a lot of corresponding receivers in the observing tube 14.

Figure 6:
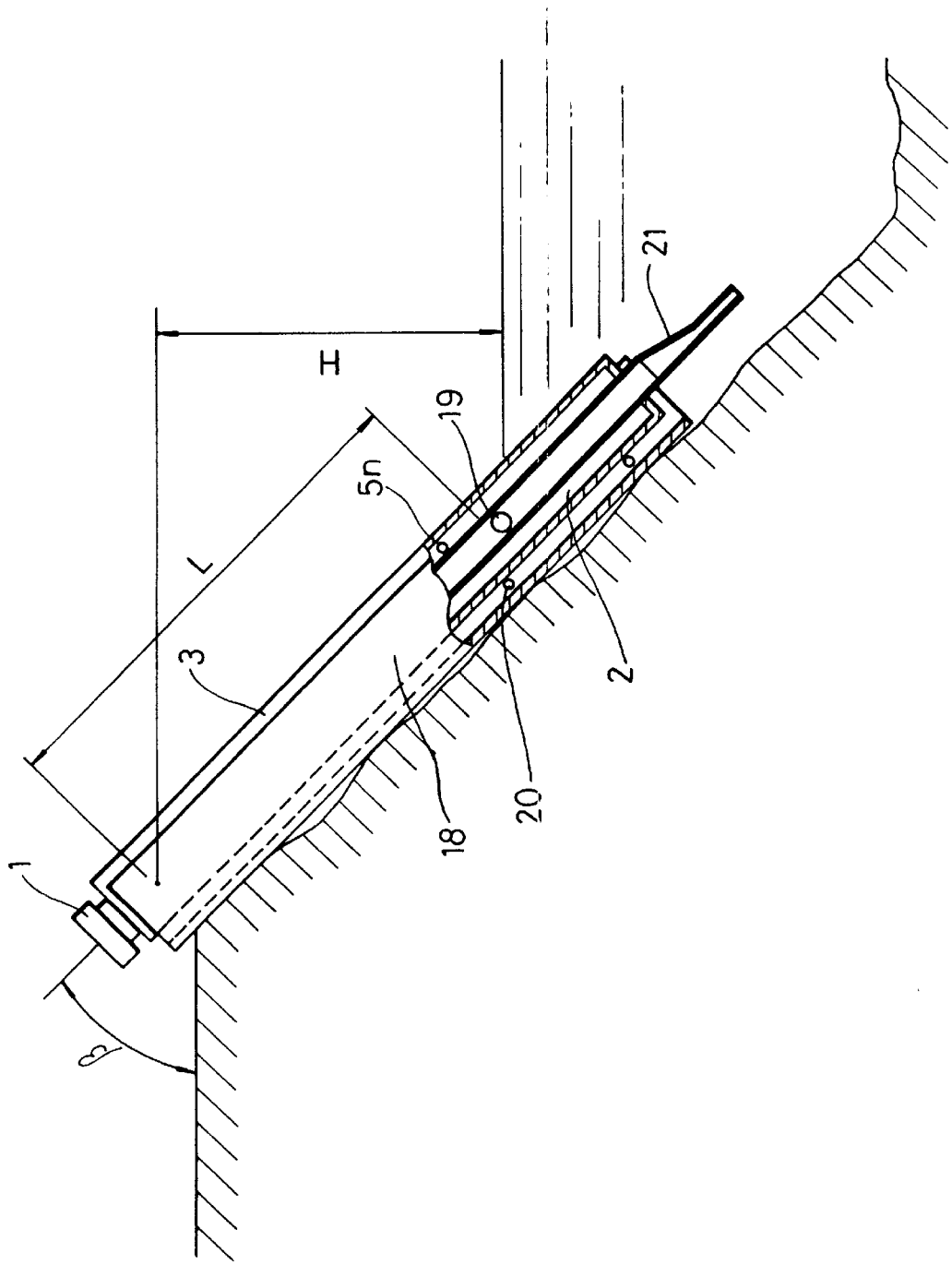
FIG. 6 is a view illustrating the configuration in which the water level measuring apparatus according to the invention is mounted on the slope surface.

According to another embodiment of the invention, the waveguide tube for a sonic levelmeter is mounted at the edge of a river or a reservoir without constructing the vertical tower to install a levelmeter. It significantly reduces the cost for installing the levelmeter. FIG. 6 is a view illustrating the installment of a sonic water level measuring apparatus according to the invention.

A supporter 18 in the form of a U-shaped structural channel is mounted at the edge of a river. A waveguide tube 2 is placed on the supporter 18, in which the supporter 18 of the U character structural channel is provided with rollers 20 to insert therein or lift the waveguide tube 14 thereon. If the waveguide tube 14 is mounted at the inclination angle of β in the supporter 18, the water surface to reflect sonic pulses forms the slope surface at the angle of 90°−β. Dependent upon the experimentation, the advancing waves and the reflecting waves of the sonic pulses are different from each other according to the inclination angle of the reflecting surface. Therefore, the water level measuring value must be corrected through the correction procedure of the levelmeter by detecting the distance differences from a sonic vibrator to the water surface along the center line of the waveguide tube according to the inclination angle of the water surface.

However, rather than the calculation of the correction coefficients related to a plurality of inclination angles, it is preferable to insert a ball-type float 19 into the waveguide tube 14, so that the correction value is constant independent of the inclination angle. The float 19 is selected to have the inner diameter smaller than that of the waveguide tube 14 by about 5% to 10% and adjusted by the weight to be immersed into water by half its length. The float 19 also is made of solid materials so as not to absorb the sonic pulses. According to the experimentation, when the sonic pulse is reflected on the semi-sphere surface, its reflecting signal is weakened by the intensity of about 2% compared with the signal reflected on the plane surface. At that time, the frequency of the sonic pulse is 1 to 2 kHz, and the measured distance is shortened by three-fifths of the half-diameter of the ball-type float 19 over the actual distance from the sonic vibrator to the water surface. This difference Δ is exactly measured during the correction test, and when the water level measuring apparatus is supposed to be mounted, the position of the sonic receiver $5_1$ is fixed upward by the difference from its reference point "0"in the waveguide tube. Therefore, the use of the ball-type float enables the correction value to be constant independent of the inclination angle of the waveguide tube. The most important thing is that the float has the contacting friction with the waveguide tube wall, but it is rotated while moved according to the change of the water level, which is very reliable. The water level H is measured as follows:

$$H = \frac{L}{\sin\beta} + \Delta \qquad (16)$$

Therefore, when the waveguide tube is installed in a inclined configuration, the water level measuring apparatus has a relatively high sensitivity. Also, in FIG. 6 the waveguide tube includes an end portion 21 having a smaller area to suppress the vibration of the water level. Then, during the rising and falling of the water level drifts or depositions around the end portion of the waveguide tube are formed. In order to prevent the formation of the drifts or deposition of the small particles, the end portion is inclined at one side surface to narrow the area as shown in FIG. 6. And also the end portion is constructed in an assembly configuration to facilitate its replacement. Thus, the waveguide tube constituted as a part of the water level measuring apparatus can be installed at the slope edge of a river or a reservoir. It is not necessary to construct the vertical tower for use in the float-type levelmeter.

On the other hand, it may be a disadvantage in that if the inclination angle β is small, the length of the waveguide tube is increased to a larger size. For example, if the change of the water level occurs in the range of 50 to 80 m during an one-year period, like an artificial reservoir to control the amount of water in various seasons, the waveguide tube mounted at the inclination angle β of 45° should have the length of 72 to 115 m. But, it is difficult to install a longer waveguide tube on the slope surface of a reservoir.

Figure 7:
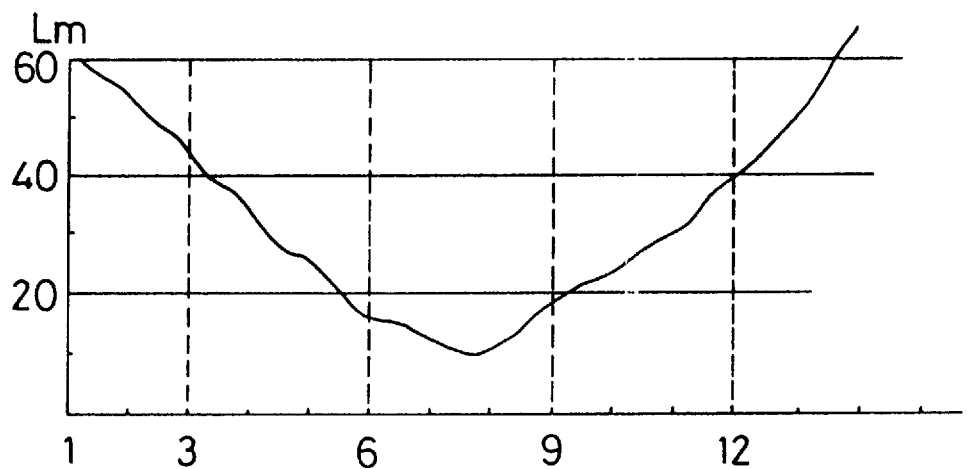
FIG. 7 is a graph illustrating the change of the water level in a reservoir; and, FIG. 8 is a view illustrating another method for measuring the water level of a reservoir using the water level measuring apparatus according to the invention.
Figure 8:
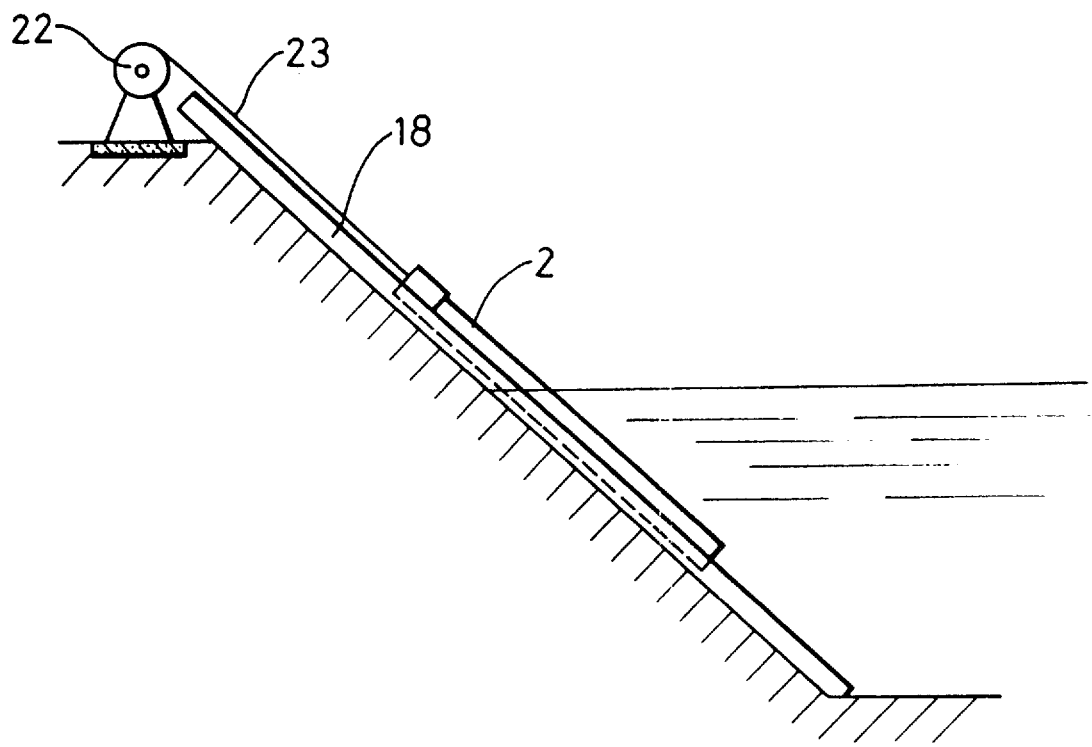

However, according to the invention a shorter waveguide tube can be used, for example: 30 m. Referring to FIG. 7, the change of the water level l is illustrated. The water level L is changed by 20 m during seasons. Thus, the waveguide tube may be moved along the U-shaped structural channel supporter 18 every few months. As shown in FIG. 8, the shorter waveguide tube 2 can be used. A lifter 22 is coupled with the waveguide tube 2 by means of a rope 23. Therefore, the lifter 22 is operated every few months to change the position of the waveguide tube 2. For example, when the amount of water is increased in summer, the waveguide tube 2 is moved upward.

On the other hand, it is preferable to install the water level measuring apparatus in a vertical angle in a small river or an artificial waterway. For example, the waveguide tube having the inner diameter of 50 mm and the length of 5 m can easily be installed by using ropes to secure it without greater costs.

What is claimed is:

1. A water level measuring apparatus comprising:
   a waveguide tube for propagating sonic pulses to be reflected off a surface of water;
   a sonic vibrator mounted on a top portion of the waveguide tube for generating sonic pulses; and
   a plurality of sonic receivers (first, second . . . nth) mounted at interval distances along the waveguide tube to receive advancing and reflecting signals of sonic pulses in turn.

2. The water level measuring apparatus as claimed in claim 1, wherein the waveguide tube has an axis oriented at an angle to the water surface, the apparatus further comprising a ball type float having an outer diameter being 90 to 95% that of the inner diameter of the waveguide tube, the ball-type float being disposed within the waveguide tube and floating in water within the waveguide tube, the ball type float presenting a hemispherical profile to sonic pulses in the waveguide tube independent of the angle between the axis of the waveguide tube and the water surface.

3. A water level measuring apparatus for measuring the level of water in a water level observing tube, the water level measuring apparatus comprising:

a plurality of sonic receivers (first, second, . . . nth);

a supporting rod inserted into the water level observing tube for supporting the plurality of sonic receivers, the plurality of sonic receivers mounted at intervals on the supporting rod to receive the advancing and reflecting signals of sonic pulses in turn; and a sonic vibrator positioned at an upper portion of the water level observing tube for generating sonic pulses to be reflected off a surface of water in the water level observing tube.

4. The water level measuring apparatus as claimed in claim 1, wherein the waveguide tube has a body and a lower end portion, the lower end portion of the waveguide tube being formed in a truncated cone configuration to have a smaller area than the body, the lower end portion having a mounting means to replace the lower end portion with another end portion.

5. A method for measuring the distance L from a zero point to a water surface and calculating a water level comprising steps of:

enabling a sonic vibrator mounted on an upper portion of a tube to generate sonic pulses having a predetermined frequency f to be reflected off the water surface;

receiving advancing wave pulses and reflecting wave pulses from the sonic vibrator, respectively, by a first sonic receiver mounted in a place to be a predetermined multiple of the diameter of the tube away from the upper portion of the tube at the zero point and by a plurality of receivers (second . . . nth) mounted in turn on the tube which are spaced at an interval distance l from the first receiver, said first receiver and said plurality of receivers generating signals in response to receiving the advancing and reflecting wave pulses;

measuring the time interval $t_1$ between the advancing wave pulse and the reflecting wave pulse received by the first receiver and the time interval $t_2$ between the advancing wave pulse and the reflecting wave pulse received by the second receiver and calculating the approximate water level L';

selecting an nth receiver mounted closest to the water surface using the approximate water level L';

measuring the time interval $t_1$ between the advancing wave pulse and the reflecting wave pulse received by the first receiver and the time interval $t_n$ between the advancing wave pulse and the reflecting wave pulse received by the nth receiver and calculating the exact water level L; and subtracting the measured water level L from the zero point of the water level measuring apparatus if the water level L is measured above sea level.

6. The method as claimed in claim 5, wherein:
the frequency f of the sonic pulse is calculated according to the inner diameter D of the tube as follows:

$$f \leq \frac{\overline{C}}{2D}$$

where $\overline{C}$ is a middle sonic velocity of air in the tube, wherein if the inner diameter D of the tube is not already set, it may be selected according to a maximum measuring scope of the water level, such that if $L \approx 100$ m, $D \geq 100$ mm, and if $L \leq 20$ m, the inner diameter D is selected to be greater than 50 mm, and wherein the interval distance l between the receivers mounted on the tube is selected as follows:

$$l \leq \Delta_L \cdot \frac{C_o + 0.5\alpha\,(T_o + T_L)_{max}}{0.5\alpha\,(T_o - T_L)_{max}}$$

where $\Delta_L$=an allowable absolute error all throughout areas to be measured, $T_o$=a temperature of air or other gases at the first receiver which is mounted proximate the upper portion of the tube, $T_L$=a temperature of air or other gases at the nth receiver which is mounted closest to the water surface, $C_o$=a sonic velocity when the temperature of air or other gases is 0° C., and $\alpha$=a temperature coefficient of a sonic velocity of air or other gases.

7. The method as claimed in claim 5, wherein:
the distance L' from the zero point of the first receiver to the water surface is approximately calculated as follows:

$$L' = \frac{t_1}{t_2} \cdot l$$

and according to the result, the nth receiver closest to the water surface is selected, the propagation time interval $t_n$ between the advancing wave pulse and the reflecting wave pulse received by the nth receiver is measured and the exact water level L is calculated using the time intervals $t_l$ and $t_n$ as follows:

$$L = \frac{t_1}{2t_n}\,(n-1)l$$

wherein if the tube is on an inclined surface of a river, where $\beta$ is the inclination angle of the tube, the water level L is calculated as follows:

$$L = \frac{t_1}{2t_n \sin\beta}\,(n-1)l$$

where the first receiver is positioned at a predetermined interval along the inclined line away from the zero point.

8. A method of measuring the propagation time that a sonic wave is emitted, reflected on a water surface having a reflecting surface and then received in air along a tube having a diameter, and calculating a water level thereby, comprising the steps of:

enabling a sonic vibrator mounted on an upper portion of the tube to generate sonic pulses having a predetermined frequency;

receiving advancing wave pulses and reflecting wave pulses from the sonic vibrator, respectively, by a first sonic receiver mounted in a position to be a predetermined multiple of the diameter of the tube away from the upper portion of the tube and a plurality of sonic receivers (second . . . nth) mounted in turn on the tube which are spaced downward at an interval distance l from the first receiver;

setting the position of the first receiver to be a reference point for measuring the water level, measuring propagation times $t_1$ and $t_2$ until the first receiver and the second receiver each receives the advancing wave pulses and then the reflecting wave pulses and calculating an approximate water level L' as follows:

$$L' = \frac{t_1}{2t_2} \cdot l$$

selecting and operating a nth receiver mounted closest to the water surface using the approximate measured water level L', measuring propagation times $t_1$ and $t_n$ until the first receiver and the nth receiver each receives the advancing wave pulses and then the reflecting wave pulses and calculating an exact water level L as follows:

$$L = \frac{t_1}{2t_n} L_o$$

where $L_o$ is a distance between the first and nth receivers previously measured, wherein if the distance l between receivers is selected, $L_o$ is equal to $(n-1) \cdot l$, while the distance l is selected as follows:

$$l \leq \Delta_L \cdot \frac{C_o + 0.5\alpha \, (T_o + T_L)_{max}}{0.5\alpha \, (T_o - T_L)_{max}}$$

where $\Delta_L$ = an allowable absolute error all throughout areas to be measured, $T_o$ = a temperature of air or other gases at the position of the first receiver mounted in said position to be a predetermined multiple of the diameter of the tube away from the upper portion of the tube, $T_L$ = a temperature of air or other gases at the position of the nth receiver which is mounted on a lower portion of the tube, $C_o$ = a sonic velocity when the temperature of air or other gases is 0° C., and $\alpha$ = a temperature coefficient of a sonic velocity of air or other gases;

whereby measuring accuracy of the water level in a wider range is enhanced.

9. The method of measuring the water level as claimed in claim 1, wherein the reflecting surface has a shape and the reflecting wave pulses have a receiving intensity, the method further comprising the steps of:

uniformizing the shape of the reflecting surface by inserting a ball type float having a half diameter into the tube in order to enhance the receiving intensity of the reflecting wave pulses and to correct a water level measuring error independent of an inclination angle β of the tube, if the tube is on an inclined surface of a river;

shortening a water level measuring distance Δ by three-fifths of the half diameter of the ball type float, wherein the ball type float is selected to have an outer diameter of 90 to 95% that of the tube and a specific gravity such that the ball type float is half immersed in water; and calculating a water level H as follows:

$$H = \frac{t_1}{2t_n} L'_o \cdot \sin\beta$$

where $L'_o = L_o + \Delta$.

* * * * *